US008230768B2

(12) United States Patent
Ozawa et al.

(10) Patent No.: US 8,230,768 B2
(45) Date of Patent: Jul. 31, 2012

(54) MITER SAW (75) Inventors: Hiromi Ozawa, Hitachinaka (JP);
Eisaku Oka, Hitachinaka (JP);
Nobuhiro Takano, Hitachinaka (JP);
Hideaki Terashima, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 658 days.

(21) Appl. No.: 11/036,140

(22) Filed: Jan. 18, 2005

(65) Prior Publication Data

US 2005/0155477 A1  Jul. 21, 2005

(30) Foreign Application Priority Data

Jan. 16, 2004 (JP) ............... P2004-009523
Dec. 7, 2004 (JP) ............... P2004-354296

(51) Int. Cl.
*B26D 7/27* (2006.01)
*B26D 5/08* (2006.01)
(52) U.S. Cl. ............ 83/522.11; 83/522.15; 83/581
(58) Field of Classification Search ............ 83/581, 83/522.15, 522.16, 522.11, 522.22, 471.3, 83/471, 477.1
See application file for complete search history.

(56) References Cited

U.S. PATENT DOCUMENTS

| | | | | |
|---|---|---|---|---|
| 3,574,315 A | * | 4/1971 | Boultinghouse | 83/490 |
| 4,320,767 A | * | 3/1982 | Villa-Real | 600/493 |
| 4,641,557 A | * | 2/1987 | Steiner et al. | 83/76.7 |
| 4,754,276 A | | 6/1988 | Carlson et al. | |
| 5,249,496 A | | 10/1993 | Hirsch et al. | |
| 5,931,073 A | * | 8/1999 | Hoyer-Ellefsen | 83/471.3 |
| 6,016,732 A | | 1/2000 | Brault et al. | |
| 6,513,412 B2 | * | 2/2003 | Young | 83/471.3 |
| 6,658,977 B2 | * | 12/2003 | Chang | 83/490 |
| 6,776,076 B2 | * | 8/2004 | Salazar | 83/435.14 |
| 6,860,183 B1 | * | 3/2005 | Chen | 83/471.3 |
| 7,039,548 B2 | * | 5/2006 | Takano et al. | 702/151 |
| 7,121,179 B2 | * | 10/2006 | Chen | 83/522.16 |
| 7,311,028 B2 | * | 12/2007 | Garcia et al. | 83/471.3 |
| 7,331,264 B2 | * | 2/2008 | Ozawa et al. | 83/471.3 |
| 2001/0000856 A1 | * | 5/2001 | O'Banion | 83/76.9 |

(Continued)

FOREIGN PATENT DOCUMENTS

DE    198 32 984    1/1999

(Continued)

OTHER PUBLICATIONS

Office Action in JP 2004-354296, dated Mar. 17, 2011 (3 pgs., in Japanese), with English language translation (3 pgs.).

*Primary Examiner* — Boyer D Ashley
*Assistant Examiner* — Omar Flores-Sánchez
(74) *Attorney, Agent, or Firm* — Antonelli, Terry, Stout & Kraus, LLP.

(57) ABSTRACT

A miter saw having good workability without decrease in angle visibility is disclosed. The miter saw includes a display unit provided on a turntable. The display unit 600 is positioned between an operating handle protruding outward from the turntable and a rotation axis of the turntable. The display unit is positioned below the upper surfaces of a base and the turntable not so as to protrude above the upper surface of the turntable. The display unit displays an inclination angle of a circular saw blade with respect to the upper surface of the base and a rotation angle of the turntable with respect to the base in a line.

28 Claims, 9 Drawing Sheets

U.S. PATENT DOCUMENTS

| | | | |
|---|---|---|---|
| 2002/0182979 A1* | 12/2002 | Griffiths | 451/9 |
| 2003/0110914 A1* | 6/2003 | Brazell et al. | 83/471.3 |
| 2004/0089125 A1* | 5/2004 | Schoene et al. | 83/471.3 |
| 2005/0247177 A1* | 11/2005 | Hetcher et al. | 83/471.3 |
| 2005/0247178 A1* | 11/2005 | Hetcher et al. | 83/581 |
| 2006/0000328 A1* | 1/2006 | Terashima et al. | 83/471.3 |
| 2006/0000330 A1* | 1/2006 | Terashima et al. | 83/471.3 |
| 2006/0005676 A1* | 1/2006 | Terashima et al. | 83/471.3 |
| 2006/0230902 A1* | 10/2006 | Oberheim | 83/522.15 |
| 2007/0079681 A1* | 4/2007 | Chuang | 83/522.11 |
| 2007/0084075 A1* | 4/2007 | Kawano et al. | 33/640 |
| 2008/0060495 A1* | 3/2008 | Garcia et al. | 83/471.3 |

FOREIGN PATENT DOCUMENTS

| | | |
|---|---|---|
| JP | 63-30101 | 2/1988 |
| JP | 05-077201 | 3/1993 |
| JP | 8-336802 | 12/1996 |
| JP | 2000-254817 | 9/2000 |

* cited by examiner

MITER SAW

BACKGROUND OF THE INVENTION

1. Field of the Invention

The present invention relates to a miter saw which displays an angle of a circular saw blade with respect to a base and/or an angle of the circular saw blade with respect to a contact surface of a fence fixed to the base.

2. Description of the Related Art

A conventional miter saw has a base for positioning a workpiece thereon, a circular saw portion for rotatably supporting a circular saw blade, and a supporting member for pivotably supporting the circular saw portion about a pivot shaft which is substantially parallel to a rotating axis of the circular saw blade. The supporting member is attached to the base so as to change an angle of the circular saw blade with respect to a upper surface of the base.

In addition, a miter saw having a turntable for supporting the workpiece along with the base is well-known. The miter saw having the above structure is configured so that the turntable and the supporting member are assembled in order to change the angle of the circular saw blade with respect to the upper surface of the base.

In addition, a miter saw having a turntable and changing the angle of the circular saw blade with respect to the contact surface of the fence is well-known. With the above structure, the turntable can support the workpiece along with the base. The turntable of the miter saw has a rotating axis which is substantially orthogonal to the upper surface of the base so that the turntable can rotate about this rotation axis with respect to the base. The miter saw further have a supporting member for pivotably supporting the circular saw portion. The supporting member is connected to the turntable.

With the above miter saw, the workpiece can be cut in a slanting direction with respect to the upper surface of the base by changing the angle between the upper surface of the base and the circular saw blade to a prescribed angle. In another case, the workpiece can be cut in a slanting direction with respect to the side face of the workpiece by changing the angle between the circular saw blade and the fence for holding the side face of the workpiece to a prescribed angle. For the above cutting operations, the miter saw is provided with a scale indicating predetermined angles in order to adjust the cutting angle for the workpiece.

The graduations of the scale are provided in pairs on the supporting member and the base, or on the supporting member and the turntable to indicate the inclined amount and the rotation amount, respectively. The operator adjusts the inclination angle and rotation angle by visually checking these graduations.

Consequently, with this type of miter saw, since the gradient angle and pivot angle are ascertained by visually checking the graduated scale, the current gradient angle and pivot angle cannot be instantaneously ascertained. In addition, based on the amount of areas of the surfaces of the supporting member, the base, and the turntable, a larger number of angles cannot be inscribed on the graduated scale. Accordingly, ascertaining the inclination angle and rotation angle other than the inscribed angles takes time, which results in a decrease in workability.

Japanese patent unexamined application publication No. 2000-254817 discloses a miter saw equipped with a detector to detect the angle of the circular saw with respect to the base, and a display unit to digitally display the angle detected by the detector. In the above miter saw, the circular saw blade is supported by an inclining member. The inclining member is inclinable with respect to a supporting member provided at the rear of the turntable. The display unit for the digital display is provided on the supporting member. And a detector provided in the display unit detects the gradient angle of the circular saw blade based on the rotation angle of a detection shaft which rotates as the inclining member inclines.

With the aforementioned miter saw, since a display unit is attached on the supporting member coupled to the rear end of the turntable, the display unit is at a position separated from the operator. Therefore, the problem arises that the angle value cannot be ascertained without peering into the display unit, which made visual inspection difficult.

In addition, since the location of the supporting member is on the side where cutting scraps are emitted during cutting, the cutting scraps may land on the surface of the display unit, thus making the angle value even more difficult to see. Moreover, when workpiece is positioned over the base, the operator cannot see the display unit clearly due to the workpiece.

In addition, visibility is degraded when, for example, the numbers are difficult to read in dark work environments. Furthermore, according to the structure of the above citation, a display unit for the gradient angle and a display unit for the pivot angle are provided separately, so both the current gradient angle and pivot angle cannot be ascertained instantaneously, which results in a decrease in workability.

In order to solve the above problems, an object of the present invention is to provide a miter saw with good workability which displays pivot and/or rotation angles of the circular saw blade.

SUMMARY OF THE INVENTION

The present invention provides a miter saw having a base, a fence, a circular saw portion, a supporting member, a turntable, rotation angle detection means, display means, and control means. The base has a workpiece placement surface for positioning a workpiece thereon. The fence is fixed to the base and has a contact surface to which the workpiece is forced. The circular saw portion rotatably supports a circular saw blade. The supporting member pivotably supports the circular saw portion about a pivot shaft extending substantially parallel to an axial direction of the circular saw blade. The turntable is connected to the supporting member. The turntable supports the workpiece along with the base. The turntable is capable of rotating about an rotating axis with respect to the base, thereby changing an angle between the contact surface of the fence and a circular saw blade. The rotation angle detection means detects a rotation angle of the turntable with respect to the base to output a signal indicating the rotation angle. The display means displays the rotation angle. The display means is provided below the workpiece placement surface so as not to protrude above the workpiece placement surface of the base. The control means generates a signal for displaying the rotation angle on the display means based on an output signal of the rotation angle detection means.

The present invention provides a miter saw having: a base, a circular saw portion, a supporting member, inclination angle detection means, display means, and control means. The base has a workpiece placement surface for positioning a workpiece thereon. The workpiece placement surface is a part of an upper surface. The circular saw portion rotatably supports a circular saw blade. The supporting member pivotably supports the circular saw portion about a pivot shaft extending substantially parallel to an axial direction of the circular saw blade. The supporting member is pivotably connected to the base in order to change an inclination angle of the circular saw blade with respect to the upper surface of the base. The inclination angle detection means detects the inclination angle to generate a signal indicating the inclination angle. The display means displays the inclination angle. The display means is provided below the workpiece placement surface so as not to protrude above the workpiece placement surface of the base. The control means generates a signal for displaying the inclination angle on the display means based on an output signal of the inclination angle detection means.

BRIEF DESCRIPTION OF THE DRAWINGS

The aforementioned aspects and other features of the invention are explained in the following description, taken in connection with the accompanying drawing figures wherein.

DETAILED DESCRIPTION OF THE PREFERRED EMBODIMENTS

A miter saw according to an embodiment of the present invention will be described with reference to FIGS. 1 to 10.

Figure 1:
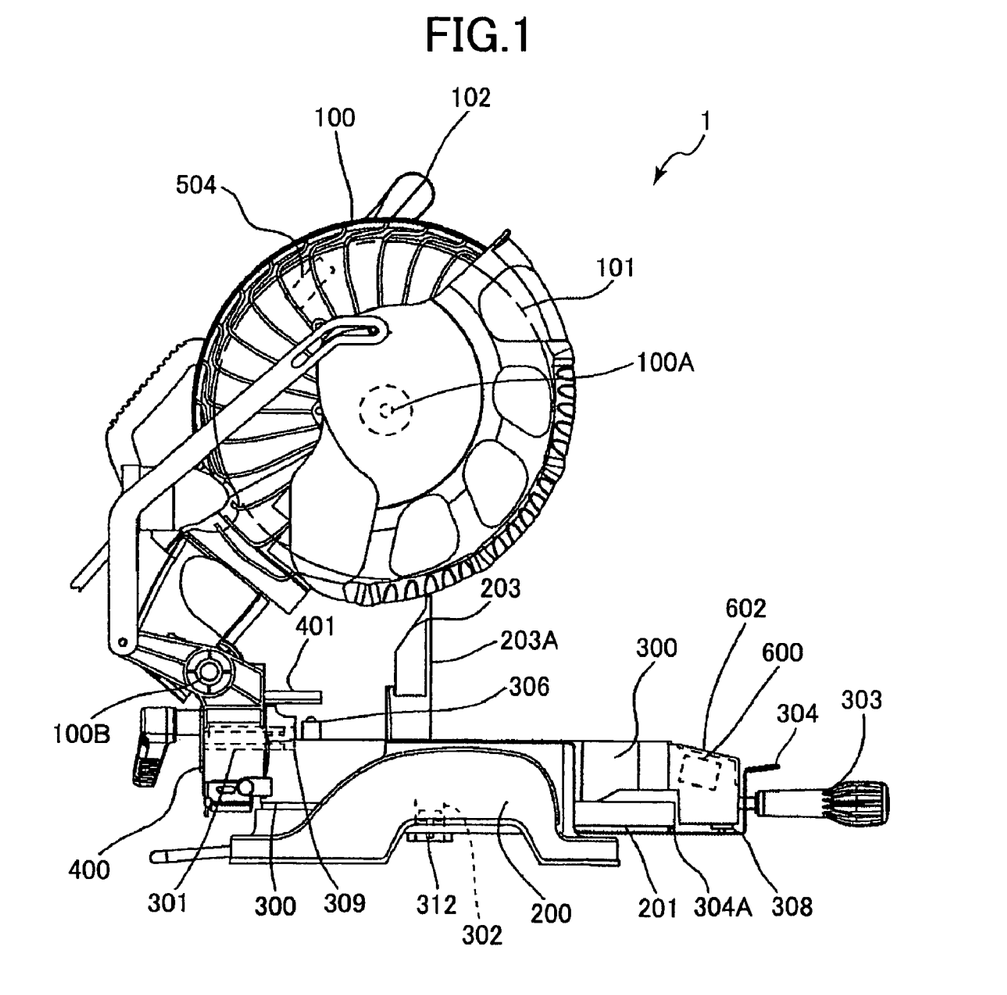
FIG. 1 is a side view showing an embodiment of the miter saw of the present invention.

Referring to FIG. 1, a miter saw 1 has a circular saw portion 100 including a circular saw blade 101; a base 200; a turntable 300, and a supporting member 400. The circular saw blade 101 is rotatably supported by a rotary shaft 100A provided in the circular saw portion 100. The circular saw portion 100 is pivotably supported by the supporting member 400 about a pivot shaft 100B which extends substantially parallel to the rotary shaft 100A of the circular saw blade 101. The supporting member 400 is supported pivotably about a rotary shaft 301 included in the plane which is flush with a upper surface of the base 200. The rotary shaft 301 is fixed to the turntable 300.

Figure 5:
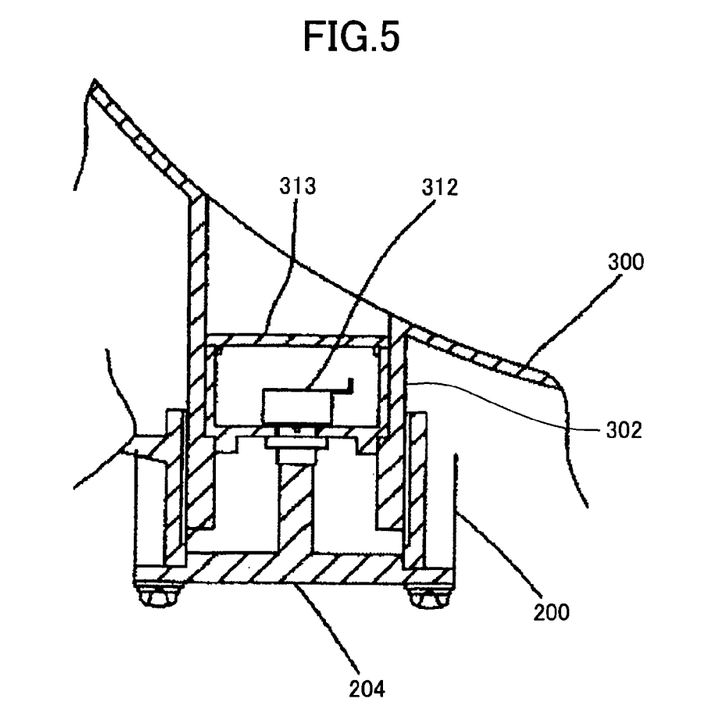
FIG. 5 is an enlarged view showing a portion C of the miter saw shown in FIG. 3.
Figure 6:
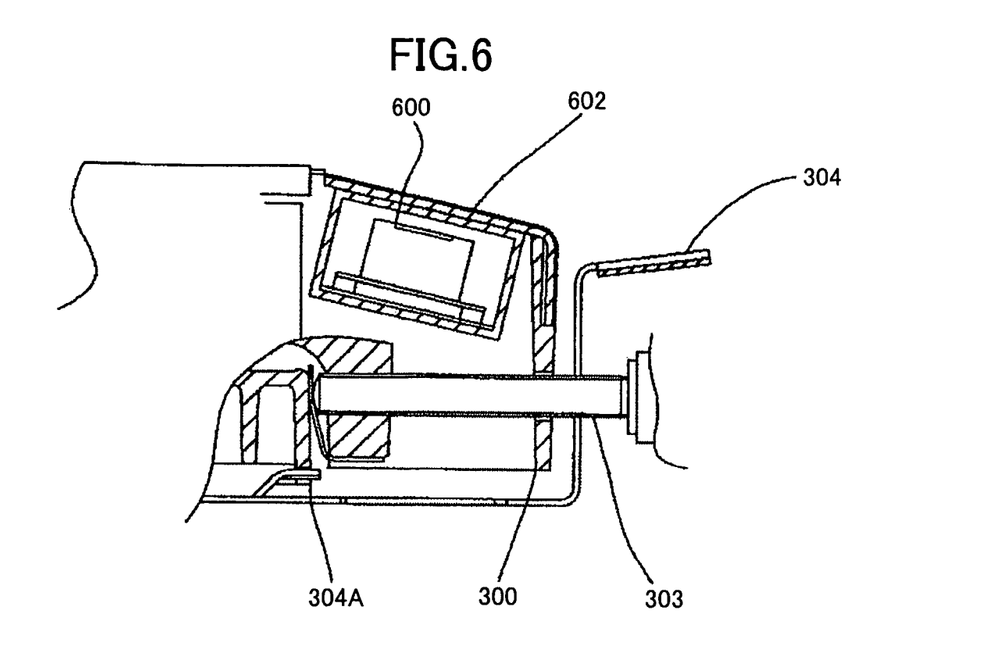
FIG. 6 is an enlarged view of a portion D of the miter saw shown in FIG. 3.

The upper surface of the base 200 and a upper surface of the turntable 300 extend in a horizontal direction. Further, the upper surface of the base 200 and the upper surface of the turntable 300 are flush with each other to form a workpiece placement surface for positioning a workpiece thereon. A pivot support portion 201 is fixed to the base 200 in order to rotatably support the turntable 300. The turntable 300 has a rotation axis 302 extending substantially perpendicularly to the upper surface of the base 200. The rotation axis has a cylindrical shape. The detailed structure of the rotation axis is shown in FIG. 5. The cylindrical rotation axis 302 is operationally integral with the turntable 300 for rotation. The turntable 300 can rotate about the rotation axis 302 with the upper surface of the turntable 300 being flush with the upper surface of the base 200.

The turntable 300 has a handle 303 for rotating a turntable 300. The handle 303 is configured so that an operator can rotate the turntable 300 with the handle 303. The handle 303 has a screw (not shown) on the top opposing the turntable 300. The screw shuttles to and fro the periphery of the base 200 by the rotation of the handle 303 about its longitudinal axis. When the screw is in contact with and forced against the base 200, the rotation of the turntable 300 with respect to the base 200 is restricted. In addition, the base 200 has a platform 202 for supporting the base 200 on a floor or a desk.

Figure 9:
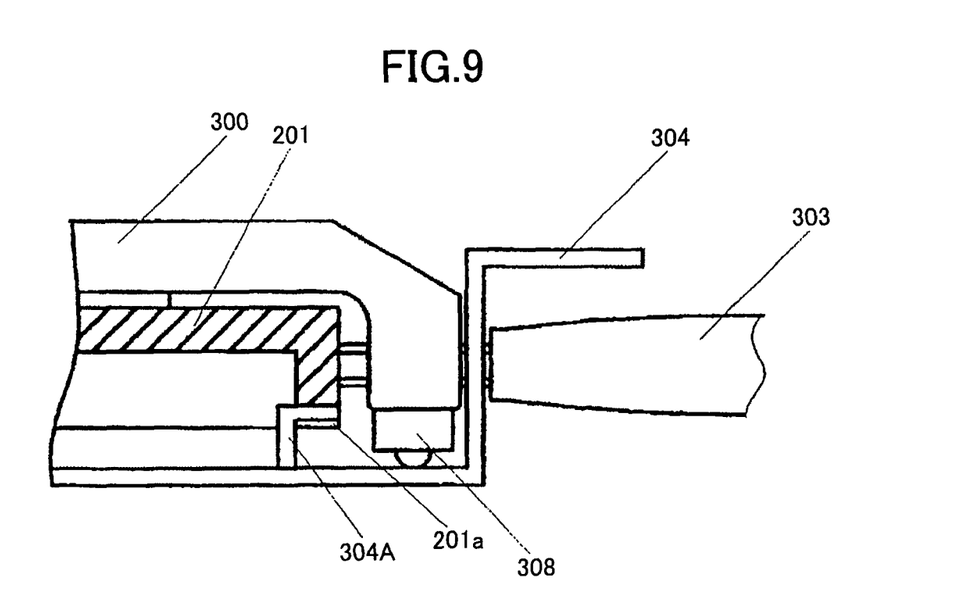
FIG. 9 is an enlarged cross-sectional view showing an operational state of the miter saw shown in FIG. 1.

The turntable 300A is provided with a lock lever 304. The pivot support portion 201 has a plurality of grooves 201a formed on the peripheral thereof. Each of the grooves 201a corresponds to a predetermined rotating angles of the turntable 300 (See FIGS. 7 and 9). The lock lever 304 is provided with an engaging portion 304A for engaging in one of the grooves 201a (FIG. 9). The lock lever 304 is forced in the upward direction in FIG. 1 by its own elastic force. One of the grooves 201a is disengaged with the engaging portion 304A by pressing the lock lever 304 downward. Therefore, the turntable 300 can be rotatable with respect to the base 200.

Figure 7:
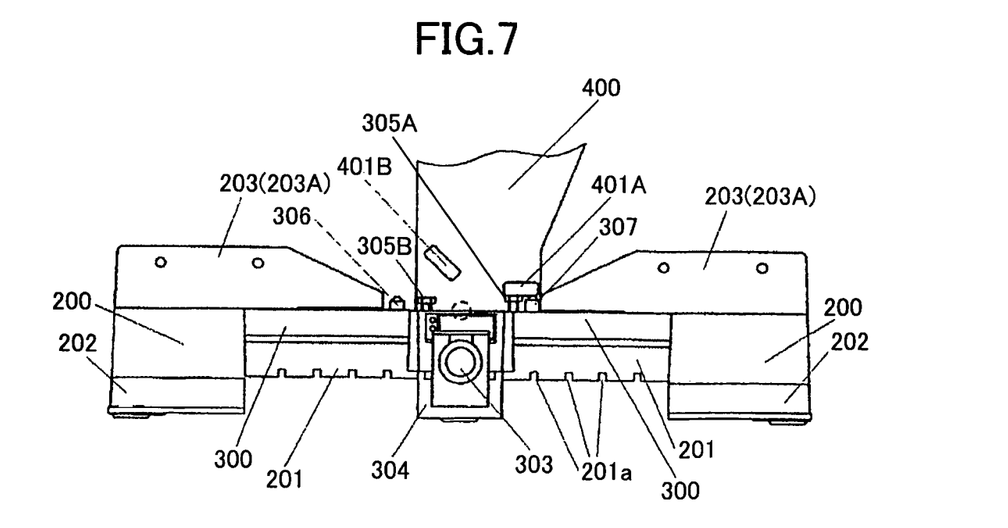
FIG. 7 is an enlarged right side view showing one operational state of the miter saw shown in FIG. 1.

As shown in FIG. 7, the plurality of grooves 201a is formed at 7.5° intervals on the periphery of the turntable 300. Accordingly, the rotation of the turntable 300 can be easily controlled at specific angles such as 15°, 30°, and 40° which are often used.

In addition, as shown in FIG. 7, a pair of bolts 305A and 305B are provided on the upper surface of the turntable 300. A pair of inclination guides 401A and 401B are provided on the supporting member 400. When the supporting member 400 is inclined to a predetermined angle with respect to the upper surface of the turntable 300, the inclination guide 401 comes into contact with the head of bolt 305. The above structure prevents the supporting member 400 from being inclined beyond the predetermined inclination angle.

As shown in FIG. 1, a fence 203 is fixed to the base 200. The fence 203 has a contact surface 203A to be in contact with a side of the workpiece positioned on the upper surface of the turntable 300 and/or the upper surface of the base 200. The contact surface 203A is provided on the opposite side from the supporting member 400, that is, on the front side of the fence 203, which corresponds to the right side in FIG. 1. The fence 203 is located across the turntable 300 so as to pass through the rotation axis 302 (FIG. 5) of the turntable 300.

Figure 8:
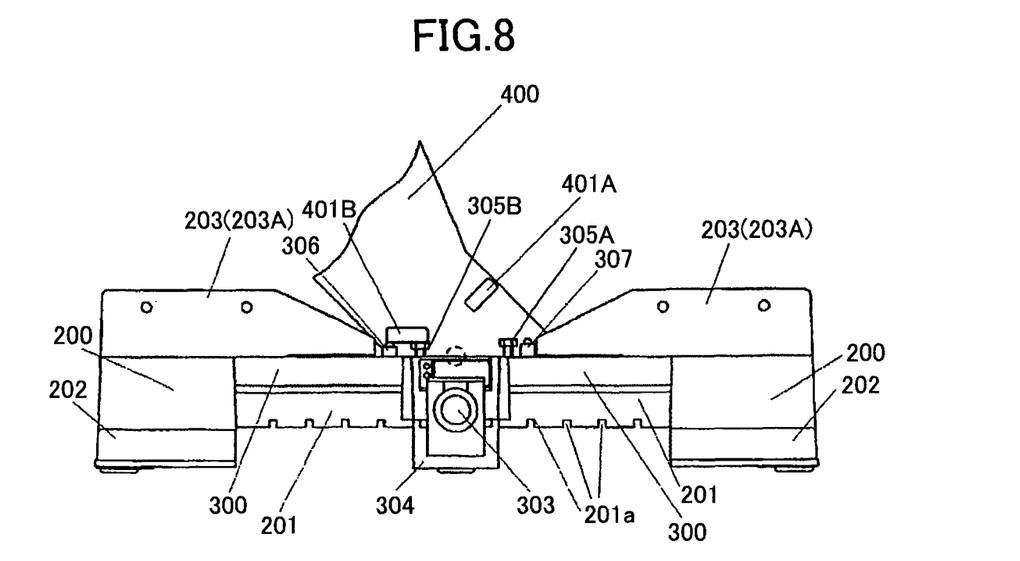
FIG. 8 is an enlarged right side view showing another operational state of the miter saw shown in FIG. 1.

The turntable 300 is provided with a limit switch 308 to detect that the turntable 300 has rotated to one of the predetermined angles formed in 7.5° intervals on the base 200. In addition, the turntable 300 is provided with limit switches 306 and 307 (FIG. 7) to detect that the side face of the circular saw blade 101 has inclined to one of the predetermined inclination angles with respect to the upper surface of the base. More specifically, as shown in FIG. 7 and FIG. 8, the limit switches 306 and 307 detect that the inclination guides 401 for restricting the inclination of the supporting member 400 have come into contact with the heads of bolts 305A and 305B.

Figure 4:
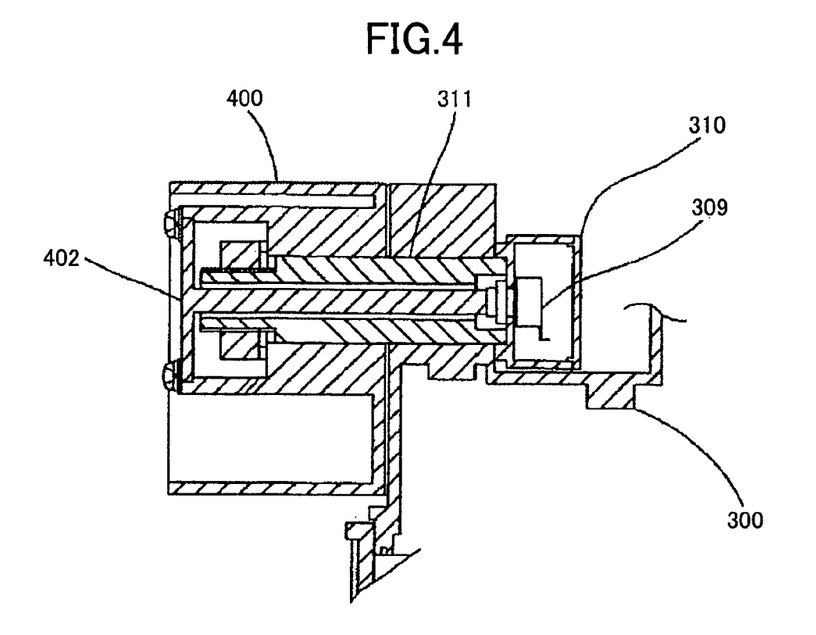
FIG. 4 is an enlarged view showing a portion B of the miter saw shown in FIG. 3.

In addition, as shown in FIG. 4, the turntable 300 is provided with a potentiometer 309. The potentiometer 309 is covered by a protective box 310 for dust protection and electrical insulation. The potentiometer 309 is positioned at one end of a cylindrical shaft 311 attached to the turntable 300.

The potentiometer 309 has a rotary shaft. One end of he rotary shaft is fixed to the supporting member 400 via a connection adapter 402.

When the supporting member 400 rotates about the cylindrical shaft 311 with respect to the turntable 300, the rotary shaft of the potentiometer 309 rotates relative to the turntable 300. In response to the above movement of the rotary shaft of the potentiometer 309, an output voltage of the potentiometer 309 changes linearly and then be sent to a microcomputer 501. The details of the microcomputer will be described later. As described above, based on the linear change in voltage, the potentiometer 309 can detect the rotation angle of the supporting member 400 with respect to the turntable 300.

In addition, as shown in FIG. 5, the turntable 300 is provided with a potentiometer 312. The potentiometer 312 is covered by a protective box 313 for dust protection and electrical insulation. The potentiometer 312 is placed on the center of the cylindrical rotation axis 302 in the turntable 300. The potentiometer 309 has a rotary shaft. One end of the rotary shaft is fixed to the base 200 via a connection adapter 204.

When the turntable 300 rotates about the rotation axis 302 with respect to the base 200, the potentiometer 312 rotates along with the turntable 300. Accordingly, the output voltage of the potentiometer 309 changes linearly and is then sent to a microcomputer 501. In this manner, based on the linear change in voltage, the potentiometer 312 can detect the rotation angle of the turntable 300 with respect to the base 200.

Figure 2:
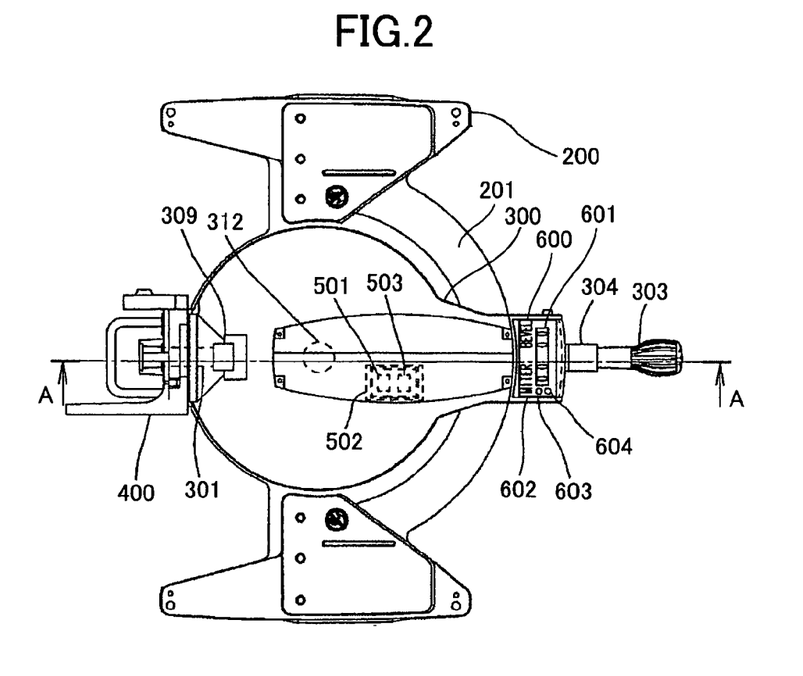
FIG. 2 is a top view showing the miter saw of FIG. 1.
Figure 3:
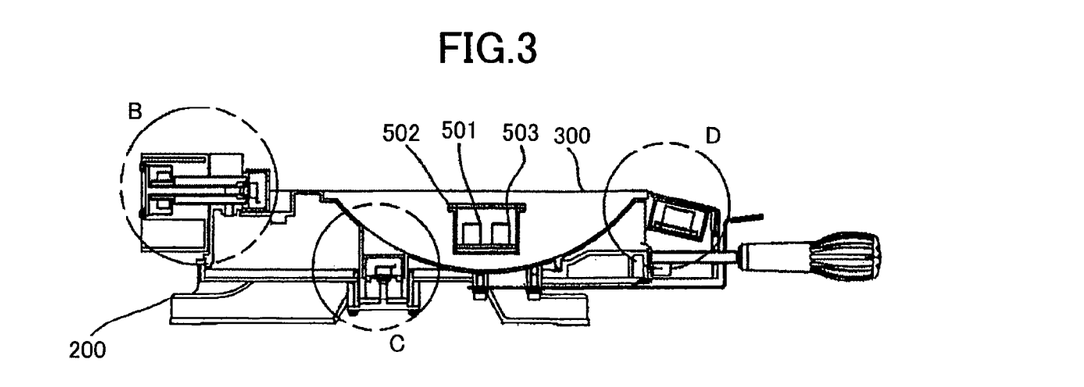
FIG. 3 is a cross-sectional view of the miter saw taken along lines of A-A of FIG. 2.

In addition, as shown in FIG. 2, the microcomputer 501 having an angle calculation function is housed within a microcomputer box 502. Further, the turntable 300 is provided with a storage unit 503 and a display unit 600. The storage unit 503 is made of an EEPROM, for example in order to stores angle data. The storage unit 503 stores the relationship between the plurality of predetermined rotating angles of the turntable 300 and the corresponding voltage value from the potentiometer. The display unit 600 is made from a liquid crystal.

As shown in FIG. 1, the circular saw portion 100 is provided with an operating handle 102. The operating handle 102 can be held by the operator when the circular saw blade portion 101 is inclined with respect to the upper surfaces of the turntable 300 and the base 200. A power supply 504 is electrically connected to each of the display unit 600, the microcomputer 501, and the storage unit 503 to feed these units 600, 501, and 503.

The microcomputer 501 can receive the signals from the limit switches 306, 307, and 308. The microcomputer 501 is configured to calculate the inclination and rotation angles based on output signals from the limit switches 306, 307, and 308, and send the resultant signals to the display unit 600 to display the inclination angle and the rotation angle on the display unit 600. The storage unit 503 is configured to store the resultant inclination angle and rotation angle calculated by the microcomputer 501.

The display unit 600 is configured with some sub-units, as shown in FIG. 2. The display unit 600 has a display surface to display an inclination angle and an rotation angle in a single sequence. The display unit 600 is positioned on the turntable 300 between the rotation axis 302 of the turntable 300 and the operating handle 303 protruding outward from the turntable 300. Further the display unit 600 is positioned below the upper surfaces of the turntable 300 and the base 200 so as not to protrude above the upper surfaces of the turntable 300. According to the above structure, the display unit 600 can be visually checked easily while rotating the turntable 300.

The upper portion of the display unit 600 is covered with a removable transparent cover 602. The upper surface of the transparent cover 602 is tilted at approximately 15 degrees from the upper surface of the base 200 and the turntable 300 toward the front operating position (the right side in FIG. 1 and FIG. 3). For this reason, visibility of the display unit 600 during operation can be improved. In addition, scratching and the accumulation of cutting scraps on the display unit 600 is prevented when the workpiece is cut.

As shown in FIG. 2, an inclination mark (MITER) and a rotation mark (BEVEL) are inscribed on the outer frame near the display surface 601 of the display unit 600. The inclination mark is related to the inclination angle display. And the rotation mark is related to the rotation angle display. According to the above structure, these marks need not be displayed on the display surface 601 in order to differentiate between the two type angles, inclination angle and rotation angle displayed on the display surface 601. Only the inclination angle and the rotation angle are displayed in a line, so that this structure enables the display unit 600 to be miniaturized.

In addition, as shown in FIG. 2, two reset buttons 603 and 604 functioning as reset switches are provided in the vicinity of the display surface 601 on the outer frame of the display unit 600. The reset buttons 603 and 604 are configured to reset the inclination angle and the pivot angle displayed on the display unit 600 independently. When the reset buttons 603 and 604 are pressed, a reset signal is sent to the microcomputer 501. The microcomputer 501 then resets the displayed inclination angle and pivot angle to 0°, respectively.

Next, the inclining operation of the miter saw 1 will be described referring to FIGS. 7 and 8. Referring to FIG. 7, the circular saw blade 101 is positioned perpendicularly to the upper surface of the base 200. Referring to FIG. 8, the supporting member 400 is maximally inclined with respect to the turntable 300. the circular saw blade 101 is inclined at 45° from the upper surface of the base 200.

In FIG. 7, the engaging portion 304A is engaged in one of the grooves 201a so that the rotation of the turntable 300 is restricted. Under this condition, any movement of the turntable 300 is restricted. When the circular saw blade is moved about the rotary shaft 302 from an acute angle with respect to with respect to the upper surface of the base 200 to a right angle with respect to the upper surface of the base 200, one of the installation guides 401 is in contact with the bolt 305A. At this time, the limit switch 307 is turned ON by the inclination guide 401A. On the other hand, when the inclination guide 401A is not in contact with the bolt 305A, the limit switch 307 is maintained OFF.

When the supporting member 400 proceeds to be inclined such that the angle between the circular saw blade and the upper surface of the base 200 becomes smaller, beginning at the state shown in FIG. 7, the angle between the circular saw blade (FIG. 1) and the upper surface of the base 200 becomes 45°, as shown in FIG. 8. That is, the supporting member 400 is maximally inclined toward the turntable 300. At this time, the inclination guide 401B is in contact with the bolt 305B. Simultaneously, the limit switch 306 is turned ON by the inclination guide 401. When the inclination guide 401B and the bolt 305B are not in contact with each other, the limit switch 306 is maintained OFF.

Figure 10:
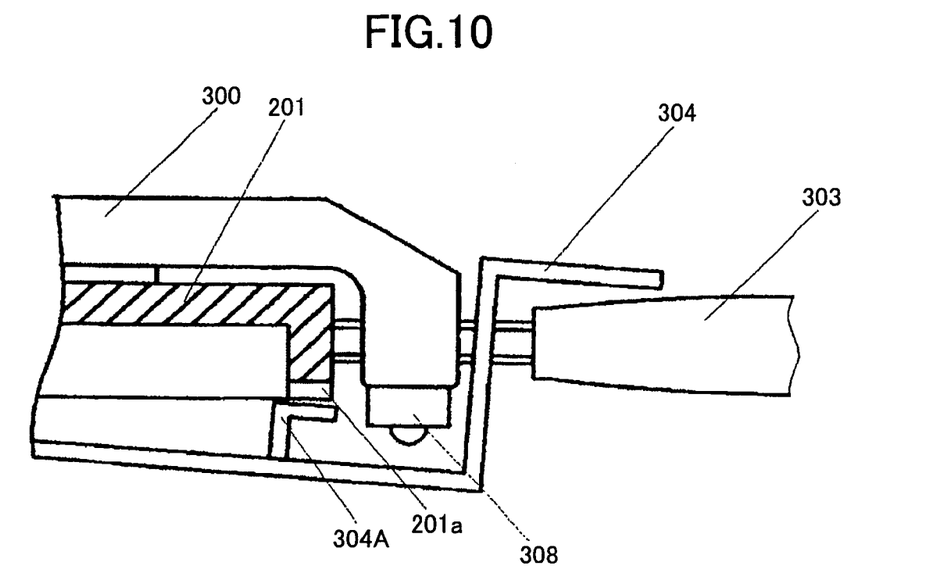
FIG. 10 is an enlarged cross-sectional view showing another operational state of the miter saw shown in FIG. 1.

Next, the rotating operation of the miter saw 1 will be described referring to FIGS. 9 and 10. Referring to FIG. 9, the engaging portion 304A of the lock lever 304 is engaged with one of the grooves 201a on the pivot support portion 201, so that the turntable 300 is not rotatable. Referring to FIG. 10, the lock lever 304 is moved downward, so that the engaging portion 304A is disengaged from one of the grooves 201a is released. Accordingly, the turntable is rotatable.

As shown in FIG. 9, When the lock lever 304 is moved by its own elastic force from the state in which the lock lever 304 is at a lower position to the state in which the engaging portion 304A integral with the lock lever 304 is engaged with one of the grooves 201a (FIG. 7 and FIG. 8), the limit switch 308 is turned ON. As shown in FIG. 10, the lock lever 304 is pressed downward from the state of FIG. 9, the engaging portion 304A is disengaged from the groove 201a, and the limit switch 308] is turned OFF.

When the turntable 300 is rotated with respect to the base 200, the engaging portion 304A is disengaged from the groove 201a by moving the lock lever 304 downward with the handle 303 as shown in FIG. 10. From this state, the turntable 300 is pivoted to any angular position, while moving the handle 303.

By rotating the operating handle 303 around its longitudinal axis, the screw on the top of the handle 303 is advanced toward and forced against the periphery of the base 200 to restrict the turntable 300 from rotating with respect to the base 200. Therefore, the turntable 303 is fixed at any given rotation angle with respect to the base 200.

Even when the engaging portion 304A is not engaged in one of the grooves 201a, the weight of the turntable 300 prevents the turntable 300 from rotating easily. Therefore, cutting work by the miter saw 1 can be satisfactorily performed even when the engaging portion 304A is not engaged in one of the grooves 201a.

Next, a method for displaying the inclination angle of the miter saw 1 will be described. When either one of the limit switch 306 and 307 is not turned ON, the microcomputer 501 determines that either one of the inclination guides 401A, 401B is not in contact with the corresponding one of the bolts 305A, 305B. The microcomputer 501 then calculates the inclination angle based on the voltage value outputted from the potentiometer 309 and the inclination angle data stored previously in the storage unit 503 to display the calculated inclination angle on the display unit 600.

When one of the limit switch 306 and 307 is turned ON, the microcomputer 501 determines that one of the inclination guides 401A, 401B in contact with the corresponding bolts 305A, 305B. The microcomputer 501 then reads the inclination angle data corresponding to the state in which one of the inclination guides 401A, 401B is in contact with the corresponding one of the bolts 305A, 305B from the storage unit 503. The microcomputer 501 then displays the inclination angle on the display unit 600.

Next, a method for displaying a rotation angle of the miter saw 1 will be described. When the limit switch 308 is not turned ON, the microcomputer 501 determines that the engaging portion 304A is not engaged in any one of the grooves 201a. The microcomputer 501 then calculates the rotation angle based on the voltage data from the potentiometer 312 and the rotation angle data stored in the storage unit 503 to display the calculated rotation angle on the display unit 600.

When the limit switch 308 is turned ON, the microcomputer 501 determines that the engaging portion 304A is engaged in one of the grooves 201a. The microcomputer 501 then selects the predetermined rotating angle from the storage unit 503 based on voltage data from the potentiometer 312 to display the selected rotation angle on the display unit 600.

Figure 11:
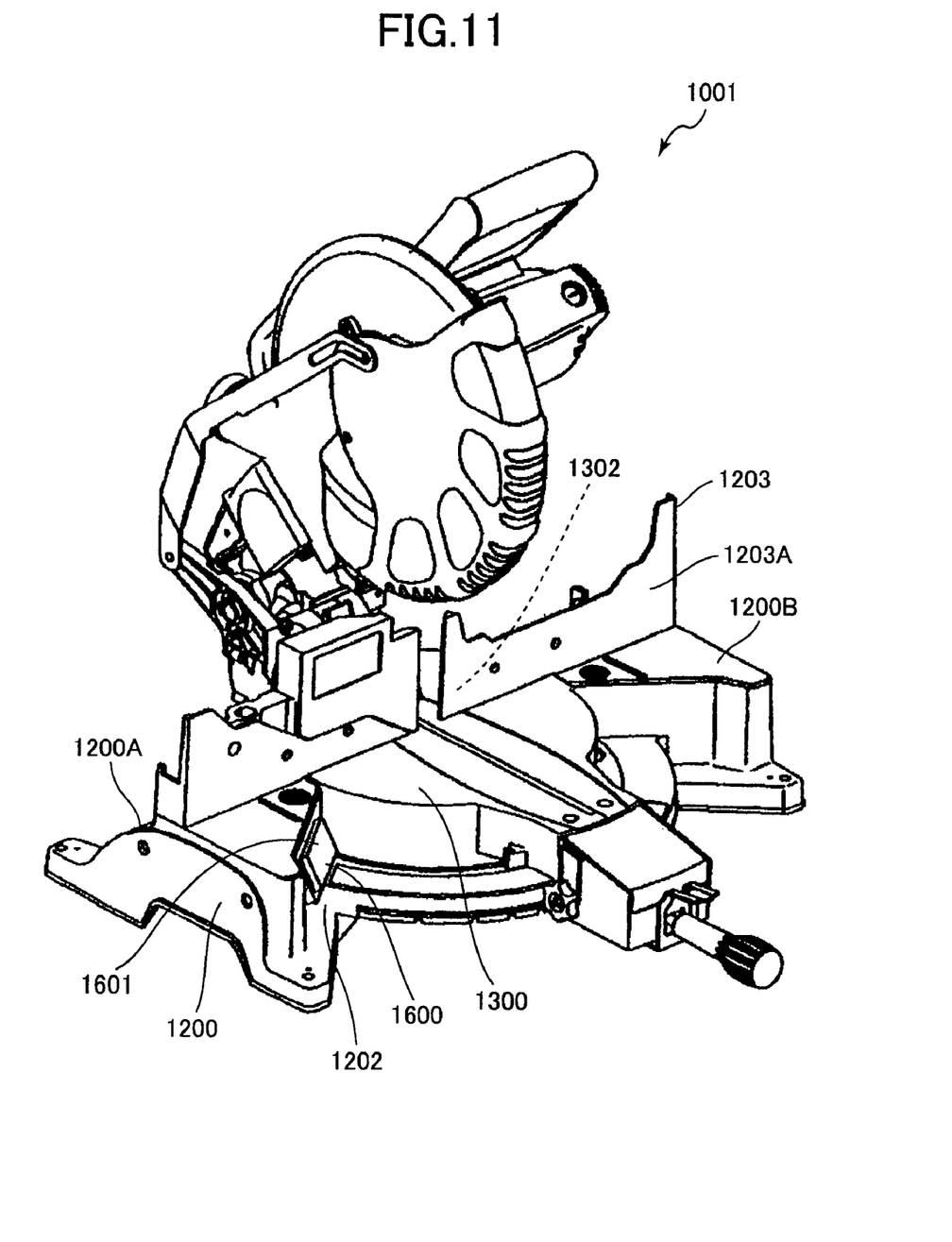
FIG. 11 is a perspective view showing another embodiment of the present invention.
Figure 12:
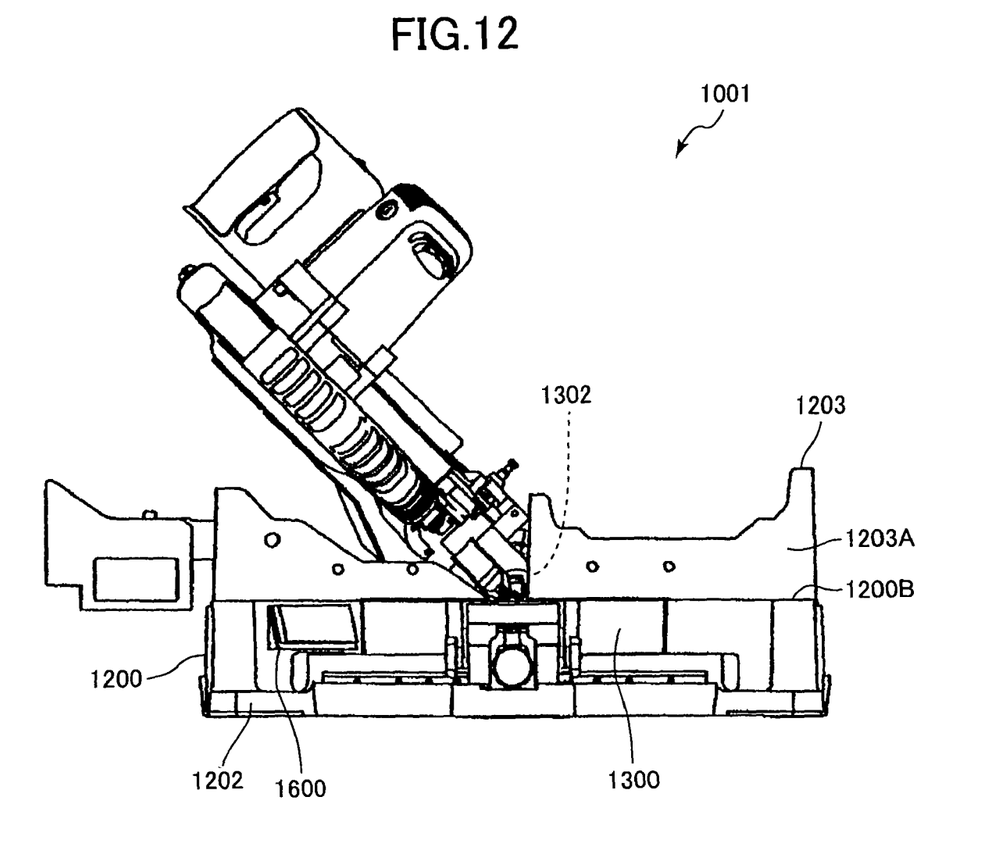
FIG. 12 is a right side view showing an operational state of the another embodiment of the present embodiment.
Figure 13:
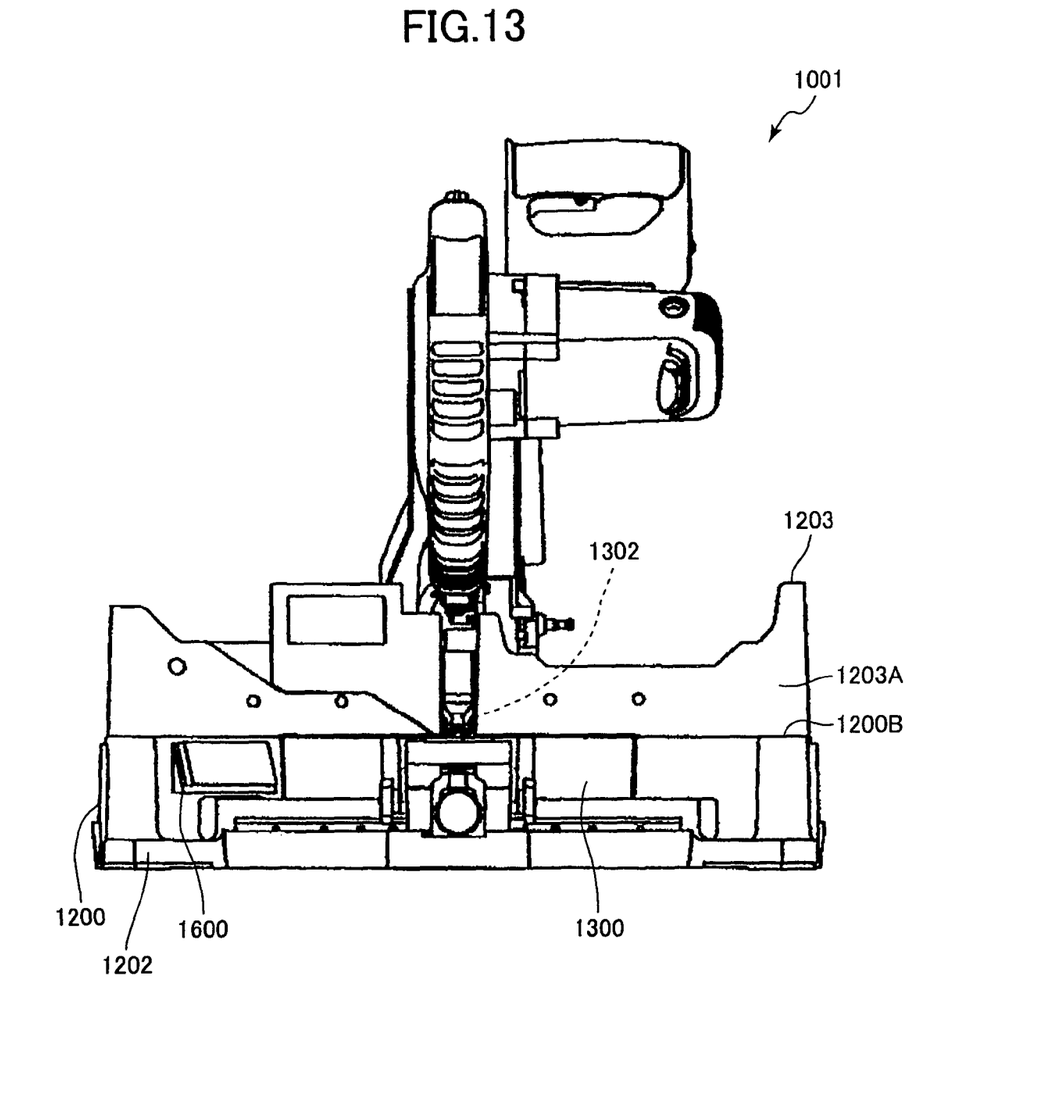
FIG. 13 is a right side view showing another operational state of the another embodiment of the present embodiment.

The miter saw according to the present invention is not limited to the embodiment described above. A lot of variations and improvements are possible within the scope of the present invention. For example, In the above embodiment, the display unit 600 is provided on the outer surface of the turntable 300. Alternatively, the display unit 600 can be provided on the base 200. For example, a display unit 1600 can be provided on the front of the platform 1202 of the base 1200, as shown in FIGS. 11 to 13. Suppose that the miter saw 1001 is divided into two parts; a front half 1200B on which the workpiece is positioned and a rear half 1200A on which workpiece is not positioned by a line passing through a rotation axis 1302. The area having the display unit 1600 is included in the front half 1200B.

Alternatively, suppose that the miter saw 1001 is divided into two parts; a front half 1200B including a contact surface 1203A to be in contact with the workpiece and a rear half 1200A not including the contact surface 1203A by using a fence 1203. In this case, the display unit 1600 is positioned below the upper surfaces of the base 1200 and the turntable 1300.

As described above, the display unit 1600 is provided below the workpiece placement surface of the base so as not to protrude above the workpiece placement surface. When the workpiece is dropped onto or brought into contact with the turntable surface, the workpiece does not hit the display unit 1600, thereby preventing the display unit 1600 from being damaged. Further, the display unit 1600 is positioned at the front part of the miter saw 1, so that the visibility of the display unit 1600 can be improved.

The display unit 1600 is positioned between the operating handle 303 and the rotation axis 302 of the turntable 1600, so that the display unit 1600 is prevented from being hidden from the operator by the workpiece on the turntable.

The display surface 1601 of the display unit 1600 is not oriented in the vertical direction. That is, the normal line of the display surface 1601 is not oriented in the horizontal direction. The display surface 1601 is inclined from the vertical direction. The normal line of the display surface 1601 is oriented above the base 1200 so as to be oriented substantially toward the line of sight of the operator. Therefore, the operator can easily recognize the rotation angle and inclination angle displayed on the display unit 1600.

The miter saw 1 of the above embodiment has the function to incline the supporting member 400 and the function to rotate the turntable 300. However, the miter saw 1 can have at least one of the above two functions. Furthermore, in the above embodiment, the supporting member 400 can be inclined in only one direction. That is, the circular saw blade 101 is inclined with respect to the base 200 from the state of FIG. 7 in which the circular saw blade 101 is perpendicular to the upper surface of the turntable 300 to the state of FIG. 8 in which the circular saw blade 101 is inclined in the leftward direction. Alternatively, the circular saw blade 101 can be inclined with respect to the turntable 300 in both leftward and rightward directions.

In the above embodiment, the inclination guides 401A, 401B of the supporting member 400 are in contact with the corresponding bolts 305A, 305B when the supporting member 400 is inclined at 45° with respect to or perpendicular to the upper surface of the base 200. Alternatively, the inclination guides of the supporting member 400 can be provided at a specific angle such as 33.9° from the normal line of the upper surface of the base 200.

Specifically, a pin and a holder which are engaged with each other can be provided on the supporting member and the turntable, respectively. When the pin is engaged with the holder, further inclination of the supporting member is restricted. Moreover, when the pin is engaged with the holder, a signal indicating that the pin is engaged with the holder can be generated. Specifically, a limit switch is provided in the holder. When the pin is engaged with the holder, the limit switch is turned ON.

Alternatively, the miter saw 1 does not have to include the turntable 300. In this case, the supporting member 400 can be connected directly to the base 200.

In another embodiment, the supporting member can be formed with some segments. In this case, the supporting member can be formed with a first segment for supporting the pivot shaft and the circular saw and a second segment for being connected to the turntable or the base. The first segment is coupled to the second segment to slide substantially in parallel to the upper surface of the base.

In another embodiment, instead of the potentiometers 309 and 312, existing rotary encoders for detecting a rotation angle can be utilized.

It is preferable that the microcomputer instructs the display unit to display an inclination angle in increments of 0.2-degree, and more preferable that the microcomputer instructs the display unit to display an inclination angle which is not multiples of 0.2 degrees such as 33.9°. Similarly, it is preferable that the microcomputer instructs the display unit to display a rotation angle in increments of 0.2-degree, and more preferable that the microcomputer instructs the display unit to display a rotation angle which is not multiples of 0.2 degrees such as 22.5° and 35.3°.

In another embodiment, it is preferable that the display unit has a backlight depending on its internal structure. This structure enables the operator to read the rotation angle and the inclination clearly even under lower light conditions.

In another embodiment, the potentiometer can be attached to the supporting member 400 so that one end of the rotary axis of the potentiometer is fixed to the turntable 300 or the base 200. Thus, the potentiometer can detect the rotation amount of the turntable 300 or the base 200 with respect to the supporting member 400.

In another embodiment, the potentiometer can be attached to the base 200, and one end of the rotary shaft of the potentiometer can be fixed to the turntable 300. Accordingly, the potentiometer can detect the rotation amount of the base 200 with respect to the turntable 300.

What is claimed is:

1. A digital miter saw comprising:
    a base having a workpiece placement surface for positioning a workpiece thereon;
    a fence fixed to the base and having a contact surface to which the workpiece is forced;
    a circular saw portion for rotatably supporting a circular saw blade;
    a supporting member for pivotably supporting the circular saw portion about a pivot shaft extending substantially parallel to an axial direction of the circular saw blade;
    a turntable connected to the supporting member, and having an upper surface cooperating with the workpiece placement surface of the base to support the workpiece, the turntable being capable of rotating about a rotating axis with respect to the base, thereby changing an angle between the contact surface of the fence and the circular saw blade;
    rotation angle detection means provided on a portion adjacent to a rotation axis of the turntable and contacted to both the turntable and the base, and provided below the workpiece placement surface, for detecting a rotation angle of the turntable with respect to the base to output an electrical signal indicating the rotation angle;
    digital display means for digitally displaying the rotation angle, the digital display means being provided below the workpiece placement surface so as not to protrude above the workpiece placement surface of the base; and
    control means for generating an electrical signal for displaying the rotation angle on the display means based on the output signal of the rotation angle detection means,
    wherein the digital display means is provided on the turntable, and
    wherein the turntable includes an operating handle protruding outward, and the digital display means is provided between the operating handle and the rotation axis of the turntable.

2. The digital miter saw as claimed in claim 1, wherein the workpiece placement surface includes an upper surface of the base,
    the supporting member is connected to the base through the turntable, the supporting member being able to incline about an inclination axis fixed to the turntable with respect to the base, the inclination axis being on a plane including the upper surface of the base and being parallel to the upper surface, and
    an inclination angle of the circular saw blade with respect to the upper surface of the base is changeable.

3. The digital miter saw as claimed in claim 1, wherein the rotation axis is a rotation shaft to rotate integrally with the turntable, and
    the rotation angle detection means detects a rotation amount of the rotation shaft with respect to the base.

4. The digital miter saw as claimed in claim 1, wherein the rotation axis is a rotation shaft fixed to the base, and
    the rotation angle detection means detects a rotation amount of the turntable with respect to the rotation shaft.

5. The digital miter saw as claimed in claim 1, wherein the digital display means includes a display surface and a removable transparent cover to cover the display surface, and the transparent cover is positioned below the workpiece placement surface so as not to protrude above the workpiece placement surface of the base.

6. The digital miter saw as claimed in claim 1, wherein the base includes a front half portion for positioning the workpiece thereon and a rear half portion closer to the supporting member, the front half and the rear half portions being divided by a line passing through the rotation axis of the base, and
    the digital display means is positioned at a predetermined position on the front half portion of the base.

7. The digital miter saw as claimed in claim 6, wherein the digital display means has a display surface extending in an inclined direction from a vertical direction.

8. The digital miter saw as claimed in claim 1, wherein the base includes a front half portion including the contact surface of the fence and a rear half portion closer to the supporting member, the front half and the rear half portions being divided by a line passing through the contact surface of the fence, and
    the digital display means is positioned at a predetermined position on the front half portion of the base.

9. The digital miter saw as claimed in claim 8, wherein the digital display means has a display surface extending in an inclined direction from a vertical direction.

10. The digital miter saw according to claim 1, wherein the digital display means does not include power switches for the miter saw.

11. The digital miter saw according to claim 1, further comprising a reset, disposed proximate to said digital display, for resetting said displayed rotation angle.

12. The digital miter saw as claimed in claim 2, further comprising inclination angle detection means to detect the inclination angle to generate a signal indicating the inclination angle, wherein the control means displays the inclination angle on the digital display means based on an output signal from the inclination angle detection means.

13. The digital miter saw as claimed in claim 12, wherein the digital display means includes a display surface to display the rotation angle and the inclination angle display thereon in a line.

14. The digital miter saw as claimed in claim 13, wherein the digital display means has a unit structure, and the digital display means has an inclination mark and a rotation mark provided on an outer frame near the display surface at positions corresponding to an inclination angle display portion and a rotation angle display portion, respectively, thereby clarifying that the digital display means displays the inclination angle and the rotation angle.

15. The digital miter saw as claimed in claim 13, wherein the digital display means includes a removable transparent cover to cover the display surface, the transparent cover being positioned below the workpiece placement surface so as not to protrude above the workpiece placement surface of the base.

16. The digital miter saw as claimed in claim 13,
wherein the digital display means includes an inclination mark related to the inclination angle display and a rotation mark related to the rotation angle display, and wherein only the inclination angle and the rotation angle are displayed digitally in a line, adjacent the inclination mark and the rotation mark, respectively, to minimize the size of the display means.

17. The digital miter saw according to claim 13, further comprising:
a reset, disposed proximate to said digital display, for resetting at least one of the angles displayed.

18. The digital miter saw according to claim 17, wherein said reset is operable to reset one or both of said displayed angles.

19. The digital miter saw according to claim 18, wherein said reset comprises separate reset members, each operable to reset one of the inclination angle and the rotation angle.

20. The digital miter saw according to claim 17, wherein said digital display comprises an LCD.

21. The digital miter saw according to claim 20, further comprising a backlight.

22. The digital miter saw as claimed in claim 1, wherein the control means is provided on the turntable.

23. The digital miter saw as claimed in claim 1, wherein the rotation angle detection means is covered by a protective box located below the workpiece placement surface, said protective box being configured to provide dust protection and electrical insulation for said rotation angle detection means.

24. The digital miter saw as claimed in claim 1, wherein the rotation angle detection means comprises a potentiometer.

25. The digital miter saw as claimed in claim 23, wherein the rotation angle detection means comprises a potentiometer.

26. The digital miter saw as claimed in claim 1, further comprising means, located below the workpiece placement surface, for protecting the rotation angle detection means from dust and for providing electrical insulation for the rotation angle detection means.

27. The digital miter saw as claimed in claim 24, wherein the potentiometer is located on the center of the rotation axis of the turntable, below the workpiece placement surface.

28. The digital miter saw as claimed in claim 25, wherein the potentiometer is located on the center of the rotation axis of the turntable, below the workpiece placement surface.

* * * * *